US005493602A

United States Patent [19]

Shibayama

[11] Patent Number: 5,493,602

[45] Date of Patent: Feb. 20, 1996

[54] PAGING RECEIVER CAPABLE OF AVOIDING DISTURBANCE RAISED ON RECEPTION OF AN UNNECESSARY MESSAGE

[75] Inventor: Hiroaki Shibayama, Tokyo, Japan

[73] Assignee: NEC Corporation, Tokyo, Japan

[21] Appl. No.: 488,459

[22] Filed: Jun. 7, 1995

Related U.S. Application Data

[63] Continuation of Ser. No. 131,387, Oct. 5, 1993, abandoned.

[30] Foreign Application Priority Data

Oct. 5, 1992 [JP] Japan .................................... 4-265689

[51] Int. Cl.$^{6}$ ........................................ H04Q 7/14

[52] U.S. Cl. ........................................ 379/57; 340/825.44

[58] Field of Search ........................ 379/57; 340/825.44, 340/825.47, 311.1; 455/31.1

[56] References Cited

FOREIGN PATENT DOCUMENTS 0317230 5/1989 European Pat. Off. .

1-254028 11/1989 Japan .

9215971 9/1992 WIPO .

*Primary Examiner*—Dwayne D. Bost

*Assistant Examiner*—Michael B. Chernoff

*Attorney, Agent, or Firm*—Sughrue, Mion, Zinn, Macpeak & Seas

[57] ABSTRACT

In a paging receiver capable of receiving and displaying a message on a display section, a receivable message format is predetermined not to receive an unnecessary message. The receivable message format is memorized as a predetermined message format in and read out of a random access memory when a reception format of a message is compared with the predetermined message format after coincidence between a reception call number and a preassigned call number assigned to the paging receiver. A plurality of predetermined message formats may be memorized in the random access memory while the preassigned call number may be a group call number.

9 Claims, 2 Drawing Sheets

(a) XX−XXX−XXXXXXXXXXXXXX (b) 12−XXXXXXXX−XXXXXXXX (c) XXX−XXX−49

PAGING RECEIVER CAPABLE OF AVOIDING DISTURBANCE RAISED ON RECEPTION OF AN UNNECESSARY MESSAGE

This is a Continuation of application Ser. No. 08/131,387 filed Oct. 5, 1993, now abandoned.

BACKGROUND OF THE INVENTION

This invention relates to a paging receiver which is capable of receiving a call number and a message following the call number.

A conventional paging receiver of the type described has a loudspeaker and a display unit, and is assigned with a preassigned call number. The paging receiver can generate a tone through the loudspeaker and display a message on the display unit when a call number received is coincident with the preassigned call number.

Recent proposal has been directed to a paging receiver which has a group call number in addition to the preassigned call number, as disclosed in Japanese Unexamined Patent Publication Tokkaihei No. 1-254028, namely, 254028/1989. Such a group call number is assigned to a prescribed group composed of a plurality of paging receivers in common and is helpful to concurrently call the prescribed group and to simultaneously transmit the same message to the plurality of the paging receivers. Specifically, persons or members in a company, a community, a school form a wide variety of groups each of which is formed by persons having common hobbies, and the like. As pointed out in the above-referenced publication, it is possible to concurrently call or access the members in each group by the use of the group call number. This is very effective to save labor and time necessary for calling all of the members in each group.

On the other hand, it is to be noted that such a group call number is wrongly or naughtily dialed by any other persons than the members. In this event, an unnecessary message is wrongly transmitted to all of the members which belong to each of the groups. Such wrong transmission of an unnecessary message is very troublesome for all of the members in each group.

Alternatively, each person possessed of such a paging receiver might hope reception of a message sent only from a specific person.

At any rate, it is preferable to avoid disturbance raised on either reception of an unnecessary message or reception of a wrong message. Especially, such reception of a wrong or an unnecessary message should be prevented in the paging receiver assigned with the group call number because a great number of persons may be disturbed by reception of the wrong or the unnecessary messages.

SUMMARY OF THE INVENTION

It is an object of this invention to provide a paging receiver which can avoid disturbance raised on reception of a wrong or an unnecessary message.

It is another object of this invention to provide a paging receiver of the type described, which is capable of preventing a wrong message from being wrongly displayed on a display section.

A paging receiver to which this invention is applicable has a preassigned number and which is supplied with a radio signal which conveys a call number and a message following the call number. The paging receiver is given the call number and the message as a reception call number and a reception message which has a message format. According to this invention, the paging receiver comprises memorizing means for memorizing a predetermined message format receivable in the paging receiver, format detecting means operated on coincidence between the preassigned number and the reception call number and coupled to the memorizing means, for detecting the message format from the reception message, judging means coupled to the memorizing means and the format detecting means for judging whether or not the message format is coincident with the predetermined message format, and notifying means coupled to the judging means for notifying reception of the reception message only when the message format is coincident with the predetermined message format.

DESCRIPTION OF THE PREFERRED EMBODIMENT

Figures 1, 2:
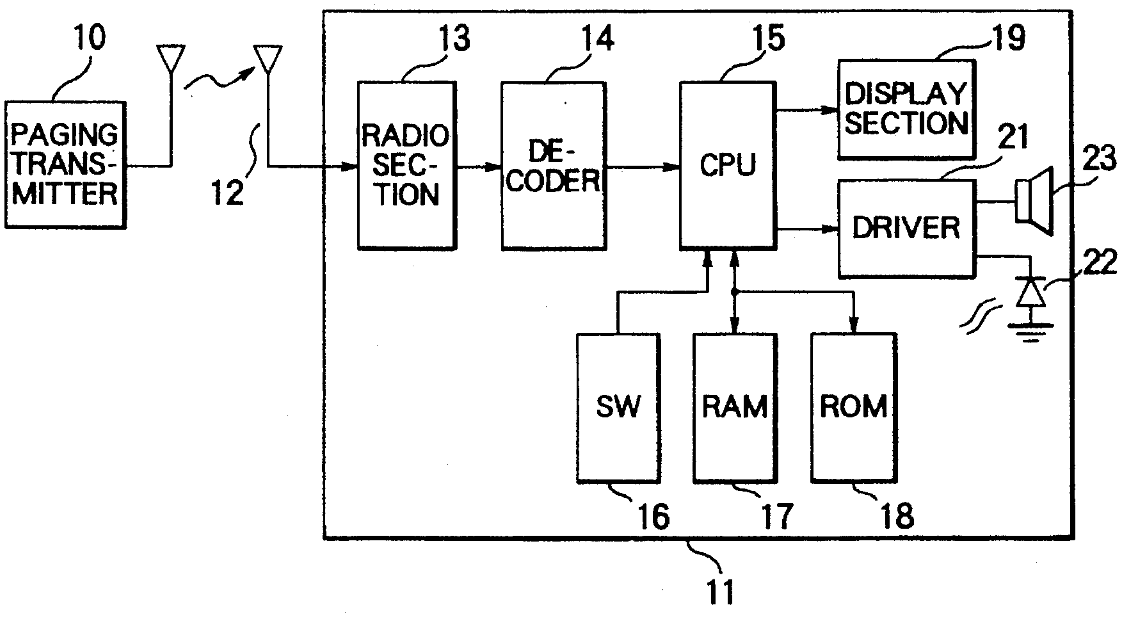
FIG. 1 is a block diagram of a paging receiver according to a preferred embodiment of this invention.
FIG. 2 is a signal format which is used to receive a call number in the paging receiver illustrated in FIG. 1.

Referring to FIG. 1, a radio communication system comprises a paging transmitter or a base station (will be simply called a paging transmitter hereinunder) 10 and a paging receiver 11 according to a preferred embodiment of this invention. The paging transmitter 10 produces a radio signal which conveys a selected one of a call number and a group call number and a message following the selected call number. The call number serves to call or page a specific paging receiver while the group call number serves to simultaneously call a plurality of paging receivers possessed by a plurality of members or persons belonging to a group. The call number and the group call number are known in the art and will not be described any longer. The message may be formed by a sequence of numbers or characters, as known in the art. In the illustrated example, the message is transmitted from the paging transmitter 10 in a modified manner, as will become clear later.

The radio signal is received through an antenna 12 by the paging receiver 11. It is assumed that the illustrated paging receiver 11 has a preassigned call number and a preassigned group call number and which can display a message. A plurality of preassigned group call numbers may be assigned to the paging receiver, although description will be made on the assumption that a single preassigned group call number alone is assigned to the paging receiver 11.

The paging receiver comprises a radio section 13 and a decoder 14. The radio section 13 is operated to receive and demodulate the radio signal sent from the paging transmitter 10 to produce a demodulated signal while the decoder 14 is operated to carry out synchronization control, an address analysis (namely, an analysis of a call number), and an analysis of a message in response to the demodulated signal. Consequently, the decoder 14 produces a decoded signal which carries the call number or the group call number and the message included in the radio signal. The call number and the group call number in the decoded signal may be called a reception call number and a reception group call number, respectively, and the message in the decoded signal will be called a reception message. The reception call number or the reception group call number in the decoded signal is separated by the decoder 14 from the reception message in the decoded signal. At any rate, the decoded signal is sent to a central processing unit (CPU) 15 which cooperates with a switch (SW) 16, a random access memory (RAM) 17, and a read-only memory (ROM) 18 in a manner to be described later in detail.

In addition, the illustrated paging receiver 11 further comprises a display section 19, a driver 21, a light emitting diode (LED) 22, and a loudspeaker 23. The display section 19 may be composed of a liquid crystal display (LCD) unit and an LCD driver and serves to display the reception message. The light emitting diode 22 emits light and the loudspeaker 23 generates a tone when they are driven by the driver 21.

In the illustrated example, it is to be noted that the paging receiver 11 can drive the driver 21 only when the reception message has a predetermined format or formats. In this event, the reception message may not be displayed even on reception of the preassigned call number or the preassigned group call number when the message has a format which is incoincident with the predetermined format or formats.

Referring to FIG. 2, three formats are exemplified which are capable of being set in the paging receiver as the predetermined formats. In FIG. 2(*a*), it is surmised that twenty numerals or characters can be displayed at first (namely, leftmost) through twentieth (rightmost) positions on the display section 19. The format shown in FIG. 2(*a*) has hyphens located at the third and the seventh positions and may be referred to as a first predetermined message format. The numerals or the characters may be located at the positions except the third and the seventh positions. Such hyphens and their positions form the format.

The format illustrated in FIG. 2(*b*) may be called a second predetermined message format and has first through twentieth positions like the first predetermined message format and hyphens located at the third and the twelfth positions. In addition, the numerals "1" and "2" are placed at the first and the second positions of the second predetermined message format, respectively. The numerals "1" and "2" at the first and the second positions may be considered as a part of the second predetermined message format like the hyphens and their positions.

In FIG. 2(*c*), a third predetermined message format is illustrated which has first through tenth positions, the hyphens located at the fourth and the eighth positions, and the numerals "4" and "9" located at the ninth and the tenth positions, respectively. Like in FIG. 2(*b*), the numerals "4" and "9" and their positions may be considered as a part of the third predetermined message format.

Referring back to FIG. 1, each of the first through the third predetermined message formats is memorized in the random access memory 17 under control of the central processing unit (CPU) 15 by operating the switch 16. Specifically, the switch 16 comprises a plurality of switch keys which can be manipulated by each possessor to input the numerals, the characters, and signs, such as the hyphen, an asterisk, in cooperation with the display section 19.

The central processing unit (CPU) 15 is operated in accordance with a program memorized in the read-only memory (ROM) 18.

Figure 3:
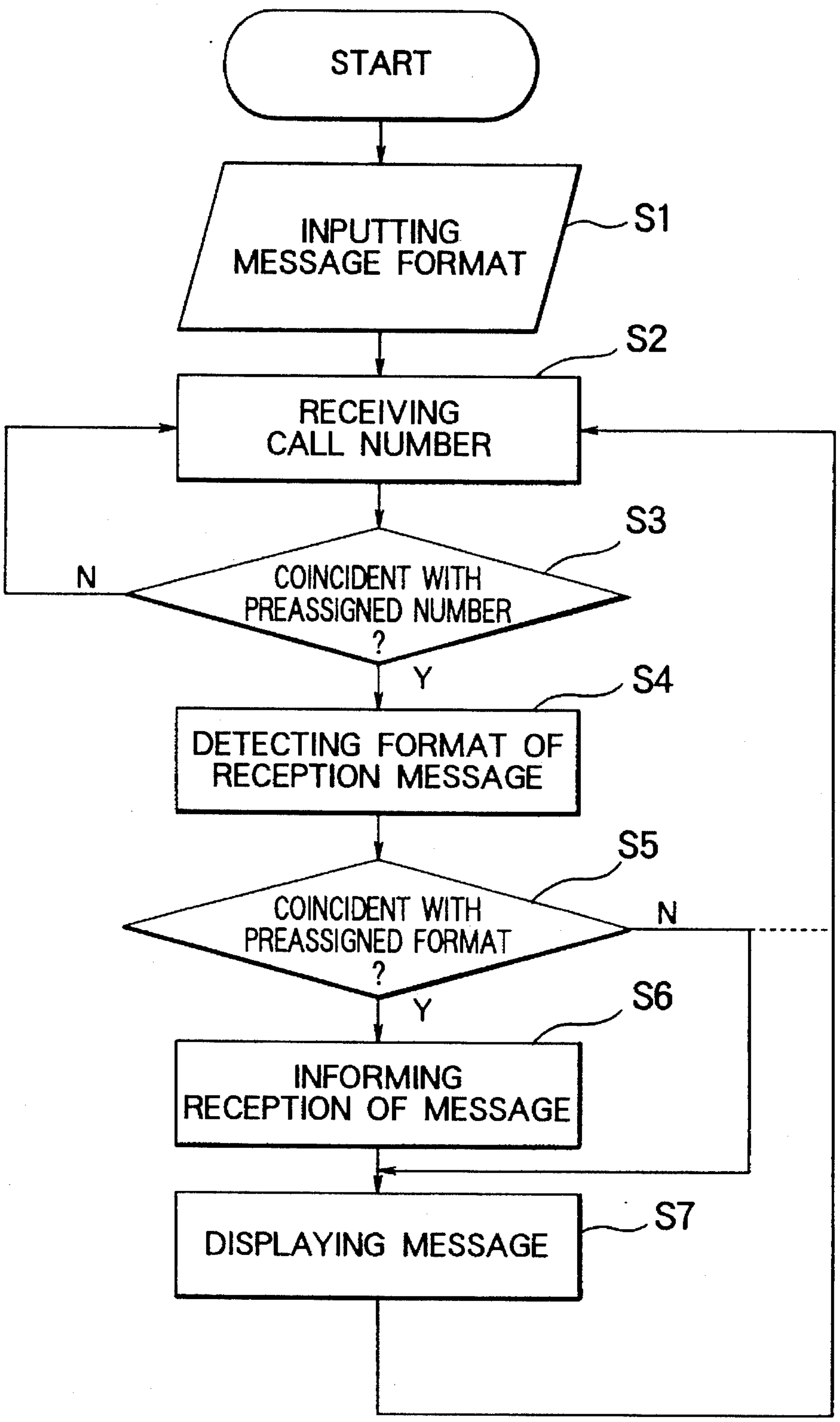
FIG. 3 is a flow chart for use in describing an operation of the paging receiver illustrated in FIG. 1.

Referring to FIG. 3 together with FIGS. 1 and 2, description will be made about processing operation of the central processing unit (CPU) 15. At first, let a specific person or persons alone know the first through the third predetermined message formats illustrated in FIG. 2 in addition to either the preassigned call number or the preassigned group call number and transmit a specific message to the illustrated paging receiver 11 in compliance with a selected one of the first through the third predetermined message formats.

In FIG. 3, each of the first through the third predetermined message formats is given to the central processing unit 15 at a first step S1 in the above-mentioned manner to be memorized into the random access memory (RAM) 17. Under the circumstances, when either the call number or the group call number is received as either a reception call number or a reception group call number and is supplied from the decoder 14 to the central processing unit 15 as a part of the decoded signal. The reception call number and the reception group call number will be collectively called a reception number. As a result, the reception number is received by the central processing unit 15, as shown at a second step S2 in FIG. 3.

The central processing unit 15 compares, at a third step S3, the reception number with each of the preassigned call number and the preassigned group call number which is stored in an internal memory included in the central processing unit 15 and which will be collectively called a preassigned number. More particularly, the central processing unit 15 judges or detects at the fourth step S3 whether or not the reception number is coincident with the preassigned number. During detection of incoincidence between the reception number and the preassigned number, the third step S3 is returned back to the second step S2.

When coincidence is detected between the reception number and the preassigned number at the third step S3, a fourth step S4 is executed by the central processing unit 15 after the third step S3 so as to detect a reception format of a reception message following the reception number. For this purpose, the central processing unit 15 accesses the random access memory 17 to read each of the first through the third predetermined message formats out of the random access memory 17. Thereafter, the reception format is successively compared with each of the first through the third predetermined message formats by the central processing unit 15. In this event, the central processing unit 15 judges at a fifth step S5 whether or not the reception format is coincident with each of the first through the third predetermined message formats.

If coincidence is detected between the reception format and a selected one of the first through the third predetermined message formats, the fifth step S5 is followed by a sixth step S6 at which reception of a message is informed. In FIG. 1, the driver 21 is driven by the central processing unit 15. Consequently, the loudspeaker 23 generates the tone while the light emitting diode 22 emits the light. Thus, the loudspeaker 23 and the light emitting diode 22 informs the possessor of reception of the message which is necessary for the paging receiver 11.

Thereafter, the message is displayed on the display unit 19 at a seventh step S7.

On the other hand, when incoincidence is detected between the reception format and the predetermined formats at the fifth step S5, the seventh step S7 directly succeeds the fifth step S5 without informing operation shown at the sixth step S6. In this operation, the reception message alone is silently displayed on the display section 19 and might be overlooked by the possessor. Alternatively, the fifth step S5 may be returned back to the second step S2 on detection of incoincidence between the reception format and the predetermined formats. In this case, no reception message is displayed on the display section 19.

Thus, the paging receiver 11 illustrated in FIG. 1 dispenses with the informing operation and/or the displaying operation when an unnecessary message is received by the paging receiver 11. This is very effective to save electric power and to avoid disturbance which might result from an uncomfortable tone or light on reception of an unnecessary message.

While this invention has thus far been described in conjunction with a preferred embodiment thereof, it will be readily possible for those skilled in the art to put this invention into practice in various manners. For example, a wide variety of predetermined message formats may be prepared and memorized in the random access memory 17 to specify persons or a single message format alone may be set in the random access memory 17. In addition, either the preassigned call number or the group call number alone may be prepared in the paging receiver.

What is claimed is:

1. A paging receiver which has a preassigned number common to a plurality of other paging receivers and which is supplied with a radio signal which conveys a call number and a message following the call number, said paging receiver being given said call number and said message as a reception call number and a reception message which has a message format, said paging receiver comprising:

memorizing means for memorizing a predetermined message format receivable in said paging receiver;

call number detecting means for detecting coincidence between said preassigned number and said reception call number;

format checking means operated only on coincidence between said preassigned number and said reception call number as determined by said call number detecting means and coupled to said memorizing means, for checking said message format from said reception message;

judging means coupled to said memorizing means and said format checking means for judging whether or not said message format is coincident with said predetermined message format; and notifying means coupled to said judging means for notifying reception of said reception message only after said format checking means checks said message format from said reception message and said judging means judges that said message format is coincident with said predetermined message format, to thereby avoid disturbance resulting from reception of a message having a format different from said predetermined message format.

2. A paging receiver as claimed in claim 1, wherein said notifying means comprises:

a loudspeaker for generating a tone only when said message format is coincident with said predetermined message format to notify reception of said reception message.

3. A paging receiver as claimed in claim 2, wherein said notifying means further comprises:

a light emitting diode for emitting light only when said message format is coincident with said predetermined message format to notify reception of said reception message.

4. A paging receiver as claimed in claim 1, wherein said notifying means comprises:

display means for displaying said reception message only when said message format is coincident with said predetermined message format to notify reception of said reception message.

5. A paging receiver as claimed in claim 1, wherein said notifying means comprises:

a loudspeaker for generating a tone only when said message format is coincident with said predetermined message format to notify reception of said reception message; and display means for displaying said reception message even when said message format is incoincident with said predetermined message format.

6. A paging receiver as claimed in claim 1, wherein said preassigned number is a selected one of a call number specific to an individual person and a group call number assigned to a group composed of a plurality of members.

7. A paging receiver as claimed in claim 1, said paging receiver further comprising:

format setting means for setting said predetermined message format into said memorizing means.

8. A paging receiver as claimed in claim 1, wherein said predetermined message format is determined by a sign and a numeral and their positions.

9. A paging receiver as claimed in claim 8, wherein said sign is a hyphen.

* * * * *